United States Patent Office 3,525,940
Patented Aug. 25, 1970

3,525,940
RADAR TRANSMITTER
Arden L. Quesinberry, Towson, Md., assignor to Westinghouse Electric Corporation, Pittsburgh, Pa., a corporation of Pennsylvania
Filed July 18, 1967, Ser. No. 654,259
Int. Cl. H04b 1/04
U.S. Cl. 325—120                                      9 Claims

ABSTRACT OF THE DISCLOSURE

The present disclosure relates to radar transmitters for supplying a pulse of energy for radiation wherein a cross field amplifier is driven by a traveling wave tube with RF energy being applied to the traveling wave tube for amplification therein. A single power supply is provided to supply operating potential via a supply circuit to the traveling wave tube to supply a pulse of energy generated in a pulse circuit to the cross field amplifier in a timed relationship to the turning on of the traveling wave tube. The operating potential supplied to the traveling wave tube is replenished after the extraction of energy from the transmitter.

BACKGROUND OF THE INVENTION

The present invention relates to radar transmitters and, more particularly, to coherent radar transmitters.

Coherent radar systems provide the capability of sensing moving targets. This is usually done by comparing the phase shift of the returning pulse, caused by the moving target, with a reference phase provided at the transmitter. The reference phase may be provided in the transmitter by the use of a source of radio frequency (RF) energy which has a stable and known phase. The moving target is sensed by correlating this stable source with the pulse to be transmitted and comparing the reference phase with the received phase-shifted pulse from the target.

A stable RF source may be utilized to provide the reference phase; however, it is necessary that amplification be provided if this source is to be used as the input energy source for the radar transmitter. The amplification may be accomplished by applying the stable RF source output to a traveling wave tube and applying the amplified output thereof to a cross field amplifier. High energy tubes such as traveling wave tubes and cross field amplifying devices require specialized power supplies for supplying the necessary operating beam potentials and pulse inputs thereto. This usually requires separate power supplies for the traveling wave device and for the cross field amplifier. This, of course, requires additional components increasing the weight and complexity of the radar transmitter, which is highly disadvantageous especially in airborne radar equipment.

SUMMARY OF THE INVENTION

Broadly, the present invention provides a new and improved radar transmitter utilizing a single power supply voltage source supplying the necessary operating potential to a traveling wave tube via a voltage supply circuit and also supplying the necessary pulse energy to a cross field amplifier through pulse circuitry. Radio frequency energy is amplified in the traveling wave tube and applied to the cross field amplifier for further amplification and radiation therefrom upon being pulsed.

DESCRIPTION OF THE PREFERRED EMBODIMENTS

Figure 1:
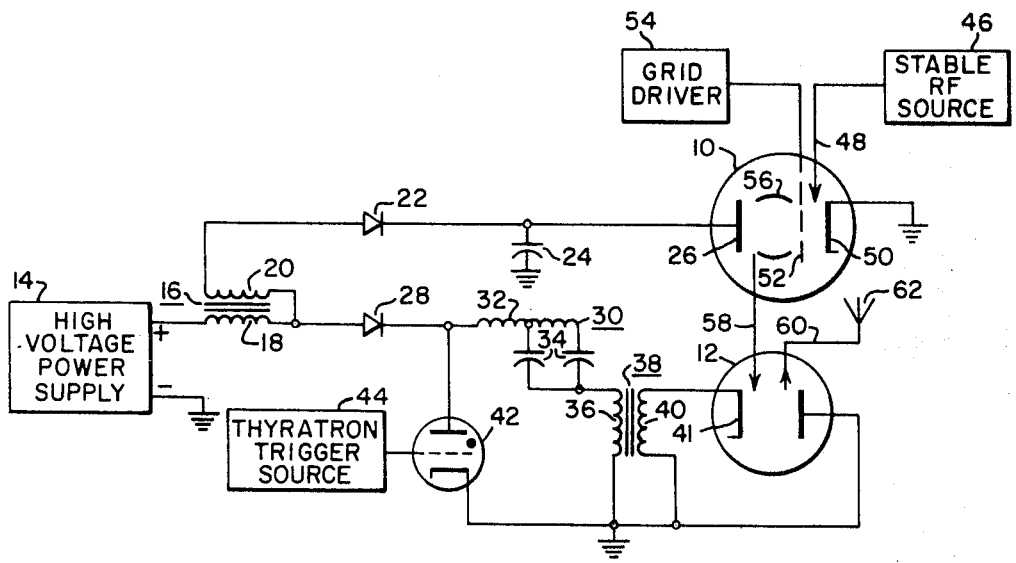
FIG. 1 is a schematic-block diagram of one embodiment of the present invention.

FIG. 1 shows one embodiment of the radar transmitter of the present invention including a traveling wave tube (TWT) 10 and a cross field amplifier (CFA) 12. Cross field amplifiers generally have characteristics which are equivalent to those of magnetrons thereby permitting the use of relatively high efficiency pulse generating modulators therefor. However, due to the relatively low gain of a CFA (typically 13 db), it is necessary that a high gain driver device be provided to supply the input RF energy for the CFA. In the present invention a gridded traveling wave tube 10 is utilized for this function. Such a TWT requires a regulated high voltage beam power supply, which ordinarily may require a separate power supply whose sole function is providing this beam voltage. However, the beam power supply for the traveling wave tube 10, as shown in FIG. 1, is provided through the use of a single high voltage power supply 14 which is also utilized as the power supply for generating the pulse energy required by the cross field amplifier 12. The supply 14 provided a direct voltage output having the polarities as indicated.

An autotransformer 16 is provided for translating voltage from the high voltage power supply 16 from a primary winding 18 connected in series with the positive terminal of the high voltage supply 14 to a secondary winding 20 connected in autotransformer relationship thereto. One end of the secondary winding 20 is connected to the end of the primary winding 18 away from the high voltage power supply 14. The other end of the winding 20 is connected to the cathode electrode of a diode 22. The cathode of the diode 22 is connected to one end of the capacitor 24 and to the collector 26 of the traveling wave tube 10. The other end of the capacitor 24 is grounded. The autotransformer 16 acts as a charging choke with the capacitor 24 charging from the secondary winding 20 through the charging diode 22. The capacitor 24 charges to a voltage of sufficient magnitude according to the particular design utilized to supply the beam voltage for the TWT 10. The diode 22 blocks the capacitor 24 from discharging therethrough back through the power supply once it has reached its operating storage level.

FIG. 1 shows the use of a line type of modulator for generating a pulse of energy for the CFA 12. A diode 28 is provided with its anode connected to the winding 18 and its cathode connected to a pulse forming network 30. The pulse forming network 30 includes an inductive portion 32 and a capacitive portion 34, which are shown schematically as separate components but may be lumped components. The other end of the pulse forming network 30 is connected to a primary winding 36 of a pulse transformer 38. A secondary winding 40 of the pulse transformer 38 is connected to the cathode 41 of the cross field amplifier 12. The collector 43 of the CFA 12 is connected at ground potential.

The pulse forming network 30 is charged from the high power supply 14 via the winding 18 and the diode 28 and is charged by voltage doubling action to approximately double the voltage of the high voltage power supply 14. This voltage is maintained on the capacitive portion of the pulse forming network 30 by the diode 28. To discharge the pulse forming network 30 and generate a pulse for supplying the CFA 12, a thyratron tube 42 is provided. The plate of the thyratron tube 42 is connected at the junction of the cathode of the diode 28 and the input end of the pulse forming network 30. The cathode of the thyratron 42 is grounded, while the control grid thereof is connected to a thyratron trigger source 44. With the pulse forming network 30 charged, the application of a pulse to the grid of the thyratron tube 42 from the thyratron trigger source 44 turns on the thyratron 42 and provides a discharge path for the pulse forming network 30 thereby providing a pulse to the primary winding 36 of the pulse transformer 38. The pulse forming network 30 is so designed to provide a substantially square wave pulse so that the primary winding 36 is activated by such a waveform.

An output pulse appears at the secondary winding 40 of the pulse transformer 38 which is applied to the cathode 41 of the CFA 12. Prior to the turning on of the thyratron 42, the beam voltage has been developed across the storage capacitor 24 for the TWT 10. The voltage across the capacitor 24 will be $V_n + nV_p$, where $V_n$ is the voltage across the pulse forming network 30 and $V_p$ is the voltage across the primary winding 18 of the transformer 16, and $n$ is the turns-ratio for the transformer 16. The components are so selected that the voltage appearing across the capacitor 24 is sufficient to supply the beam voltage requirements of the traveling wave tube 10. The capacitor 24 is so selected to have sufficient capacity to accommodate the voltage droop caused as a result of energy being extracted from the traveling wave tube 10.

The radio frequency input for the transmitter shown in FIG. 1 is supplied by a stable RF source 46 which provides an RF output having a predetermined phase which is maintained throughout the operation of the transmitting system. The RF output of the stable RF source 46 is supplied via an input 48 into the TWT 10. TWT 10 also includes a cathode 50 which is grounded, a grid 52 which is supplied by a grid driver 54, a delay line 56 disposed between the grid 52 and the collector 26. The RF output of the TWT 10 is taken via an output 58 and supplied as an input to the cross field amplifier 12.

The gridded traveling wave tube 10 does not supply an RF output until turned on by the grid driver 54 supplying a turn on signal to the grid 52 thereof. The grid driver 54 and the thyratron trigger source 44 are synchronized so that the traveling wave tube 10 is activated to supply an RF output at its output 58 thereof at the time the thyratron 42 is turned on providing the pulse from the pulse forming network 30 to the pulse transformer 38, which, in turn, supplies a pulse of energy to the cathode 41 of the CFA 12. The CFA 12 in response to RF output 58 supplied thereto from the TWT 10 and receiving a pulse of energy at cathode 41 from the modulator circuitry supplies an amplified output at its output 60 to be radiated from an antenna 62. This output is of high gain due to the combined gains of the TWT and the CFA 12 and has a predetermined phase relationship as determined by the stable RF source 46 thus enabling coherent operation of the radar transmitter.

After an energy pulse has been outputted from the CFA 12, the TWT 10 returns to its normal no output state.

With the thyratron 42 turning off, the recharging portion of the operative cycle begins. The pulse forming network 30 recharges from the high voltage power supply 14 through the winding 18 and diode 28 to a voltage substantially twice that of the voltage of the high voltage power supply 14 with this voltage being maintained by the diode 28 until the thyratron 42 is again triggered on. The outputting of energy from the traveling wave tube 10 causes some drop in the voltage stored in the voltage supply circuit capacitor 24 for the traveling wave tube 10. During the recharging portion of the cycle, this voltage is replenished from the secondary winding 20 of the autotransformer 16 and the diode 22 to recharge the capacitor 24 to its desired beam operating voltage level. Both the modulator and voltage supply circuitry for the TWT 10 being recharged an output pulse from the radar transmitter may be brought about by the activation of the thyratron 42 and the TWT 10 as previously described.

Figure 2:
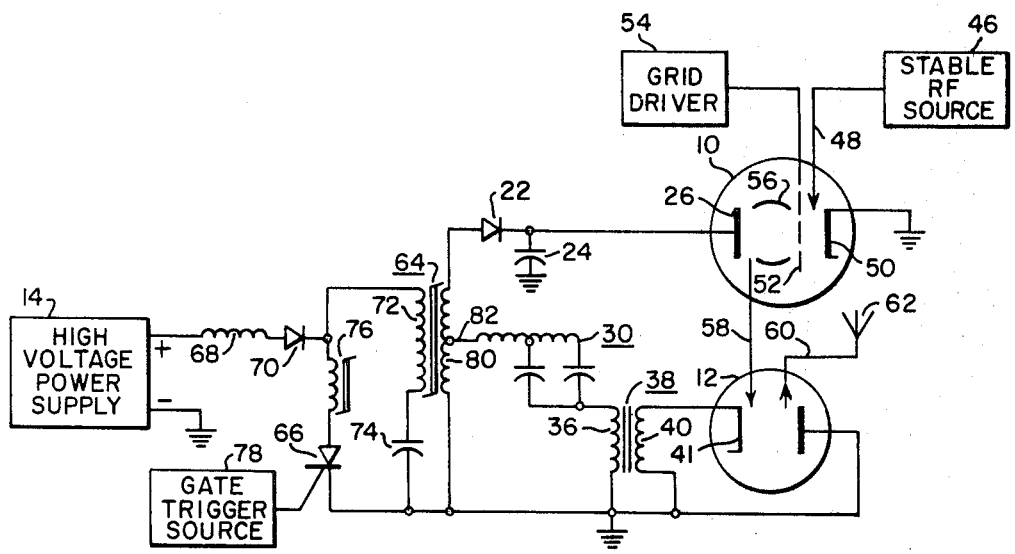
FIG. 2 is a schematic-block diagram of another embodiment of the present invention.

FIG. 2 shows another embodiment of the present invention utilizing a controlled rectifier-saturable reactor type of modulator. In FIG. 2 components performing similar functions to those in FIG. 1 are given the same number designations. The interconnections for the traveling wave tube 10 and the cross field amplifier 12 are the same as those in FIG. 1. However, an interstage saturable transformer 64 is utilized along with a silicon controlled rectifier (SCR) 66 to control the generation of the operating beam potential for the TWT 10 and the pulse generation for the CFA 12. A charging choke 68 and a diode 70 are connected between the positive terminal of the high voltage power supply 14 and the top end of the primary winding 72 of the saturable interstage transformer 64. A capacitor 74 is connected between the bottom end of the primary winding 72 and ground. The capacitor 74 charges through the choke 68, the diode 70 and the winding 72 to approximately twice the voltage of the high voltage power supply 14 by voltage doubling action. A saturable delay reactor 76 is connected between the junction at the cathode of the diode 70 and the top end of the primary winding 72 and the anode of the controlled rectifier 66. The cathode of the SCR 66 is grounded.

Once the capacitor 74 has charged to a predetermined voltage, which is maintained thereby by the diode 70, the SCR 66 is triggered on in response to a pulse being applied to the gate electrode thereof from a gate trigger source 78. A discharge path is thus provided for the capacitor 74 through the primary winding 72, the saturable delay reactor 76 and the anode-cathode circuit of the SCR 66. The saturable reactor 76 is designed to have a time delay before saturating to delay the application of full current to the SCR 66 immediately after being gated on which might damage the SCR. However, once the SCR 66 is capable of sustaining greater current, the delay reactor 76 saturates to a low impedance state to permit the capacitor 24 to the high voltage apearing at the top end of circuit of the SCR 66. In response to the discharge of the capacitor 74, a high voltage is induced in the secondary winding 80 of the interstage saturable transformer 64. The high voltage secondary winding 80 includes a tap 82 thereon which is connected to the input end of the pulse forming network 30 with the pulse forming network 30 being charged in response to the voltage induced in the winding 80 to the tap 82. The bottom end of the winding 80 is grounded, while the high voltage end thereof is connected to the anode of the diode 22. The high voltage appearing at the top end of the winding 80 therefore causes charging current to be applied to charge the capacitor 24 to the high voltage appearing at the top end of the winding 80. This voltage is so selected to be proper operating beam voltage for the TWT 10. The pulse forming network 30 and storage capacitor 24 being charged to desired voltage levels, the saturable interstage transformer 64 is designed to saturate thereby providing a low impedance discharge path for the pulse forming network 30 between the tap 82 and ground. This causes the pulse forming network 30 to discharge thereto and provides a substantially square wave pulse to the primary winding 36 of the pulse transformer 38. This pulse is transformed to the secondary winding 40 for application to the cathode electrode 41 of the cross field amplifier 12.

At the time the interstage transformer 64 saturates, the grid driver 54 supplies a gating signal to the traveling wave tube 10 to turn it on to cause the RF output 58 thereof to be supplied to the CFA 12. In response to the RF input to the CFA 12 and the pulse supplied to the cathode 41 thereof from the discharge of the pulse forming network 30, an amplified RF pulse is supplied at the output 60 of the CFA 12 for radiation by the antenna 62.

After a pulse of energy has been extracted from the radar transmitter, the system recharges with the TWT 10 turning off, the saturable transformer 64 going out of saturation, and the SCR 66 reverting to its normal non-conductive state. The charging cycle then begins with the capacitor 74 recharging through the choke 68, the diode 70 and the winding 72. The SCR 66 is then triggered on with a high voltage being induced in the winding 80 to recharge the pulse forming network 30 and to replenish any drop in the voltage across the capacitor 24 due to the extraction of energy from the TWT 10. The pulsing portion of the cycle then proceeds when the saturable transformer 64 saturates to apply a pulse to the CFA 12 and in time correspondence thereto the TWT 10 is triggered on.

In summary, it can therefore be seen that the embodiment as shown in FIG. 1 utilizing a line type of modulator and the embodiment of FIG. 2 utilizing a saturable reactor SCR type of modulator operate to supply the necessary beam voltage and pulse generating capability required while employing only a single high voltage power supply 14. It should be noted that the output voltage of the high voltage power supply 14 in FIG. 2 can be of a lower magnitude than that utilized in FIG. 1 because of the use of the interstate saturable transformer 64 supplying the necessary high voltage output at its secondary winding to develop the necessary beam voltage for the TWT 10.

Although the present invention has been described with a certain degree of particularity, it should be understood that the present disclosure has been made only by way of example and that numerous changes in the details of circuitry and the combination and arrangement of parts and elements can be resorted to without departing from the spirit and scope of the present invention.

What is claimed is:
1. A coherent radar transmitter comprising:
a direct voltage source;
a traveling wave tube;
a voltage supply circuit for said traveling wave tube including,
a storage device,
translating means for translating voltage from said source to charge said storage device to a predetermined voltage,
blocking means to maintain said predetermined voltage on said storage device, and
coupling means for supplying said predetermined voltage to said traveling wave tube;
a radio frequency source for supplying an RF input to said traveling wave tube;
gating means for turning on said traveling wave tube at predetermined times to provide an amplified output therefrom;
a cross field amplifier;
means for applying said output of said traveling wave tube as an input to said cross field amplifier for amplification therein; and
pulse means supplied by said direct voltage source for providing a pulse of energy to said cross field amplifier at predetermined times said cross field amplifier providing an amplified pulse output therefrom in response to said output from said traveling wave tube.

2. The transmitter of claim 1 wherein:
said storage device comprising a capacitor,
said blocking means comprising a rectifying device connected between said translating means and said capacitor, and
said coupling means coupling said capacitor to said traveling wave tube.

3. The transmitter of claim 2 wherein:
said translating means comprising a transformer including primary and secondary windings,
said primary winding operatively connected to said direct voltage source, and said secondary winding operatively connected to said rectifying device for charging said capacitor.

4. The transmitter of claim 3 wherein:
said pulse means including,
a pulse forming network,
charging means operatively connected between said direct voltage source and said pulse forming network for charging said network to a predetermined voltage,
a pulse transformer operatively connected between said pulse forming network and said cross field amplifier, and
discharge means for discharging said pulse forming network through said pulse transformer to supply said pulse of energy to said cross field amplifier.

5. The transmitter of claim 4 wherein:
said radio frequency source being a stable RF source for providing oscillations at RF frequencies and of a predetermined phase.

6. The transmitter of claim 4 wherein:
said primary winding of said translating means is connected in series with said voltage source, and said secondary winding of said translating means is connected in auto-transformer relationship to said primary winding and to said rectifying device.

7. The transmitter of claim 5 wherein:
said primary winding operatively connected to said direct current source, and said secondary winding including a high voltage tap and a lower voltage tap thereon, said high voltage tap connected to said rectifying device, and said lower voltage tap connected to said pulse forming network.

8. The transmitter of claim 6 wherein:
said pulse means including a rectifying device connected between said primary winding and said pulse forming network to block the discharge of said network until desired;
said discharge means including,
a switching device operatively connected to said pulse forming network, and
a trigger source for turning on said switching device to provide a discharge path for said pulse forming network therethrough to said pulse transformer, said trigger source turning on said switching means at a predetermined time relationship with respect to said gating means turning on said traveling wave tube.

9. The transmitter of claim 7 wherein:
said transformer of said translating means comprising a saturable transformer,
a charging capacitor connected in series with said primary winding of said saturable transformer and being charged from said voltage source,
said discharge means including a switching device operatively connected across said primary winding and said charging capacitor,
a trigger source for turning on said switching device to provide a discharge path for said charging capacitor through said primary winding and said switching device, said saturable reactor saturating in response to the discharge of said charging capacitor to provide a discharge path for said pulse forming network therethrough to said pulse transformer, said pulse of energy from said pulse forming network being supplied to said cross field amplifier in time correspondence to said traveling wave tube supplying said output to said cross field amplifier.

References Cited

UNITED STATES PATENTS

| | | | |
|---|---|---|---|
| 2,820,197 | 1/1958 | Donal | 332—5 |
| 3,015,739 | 1/1962 | Manteuffel | 328—65 XR |
| 2,955,263 | 10/1960 | Hobrough | 328—59 XR |

ROBERT L. GRIFFIN, Primary Examiner

A. J. MAYER, Assistant Examiner

U.S. Cl. X.R.

328—67